B. P. MULLOY.
AUTOMATIC WEIGHING MACHINE.
APPLICATION FILED JAN. 3, 1913.
1,082,354.
Patented Dec. 23, 1913.
4 SHEETS—SHEET 1.
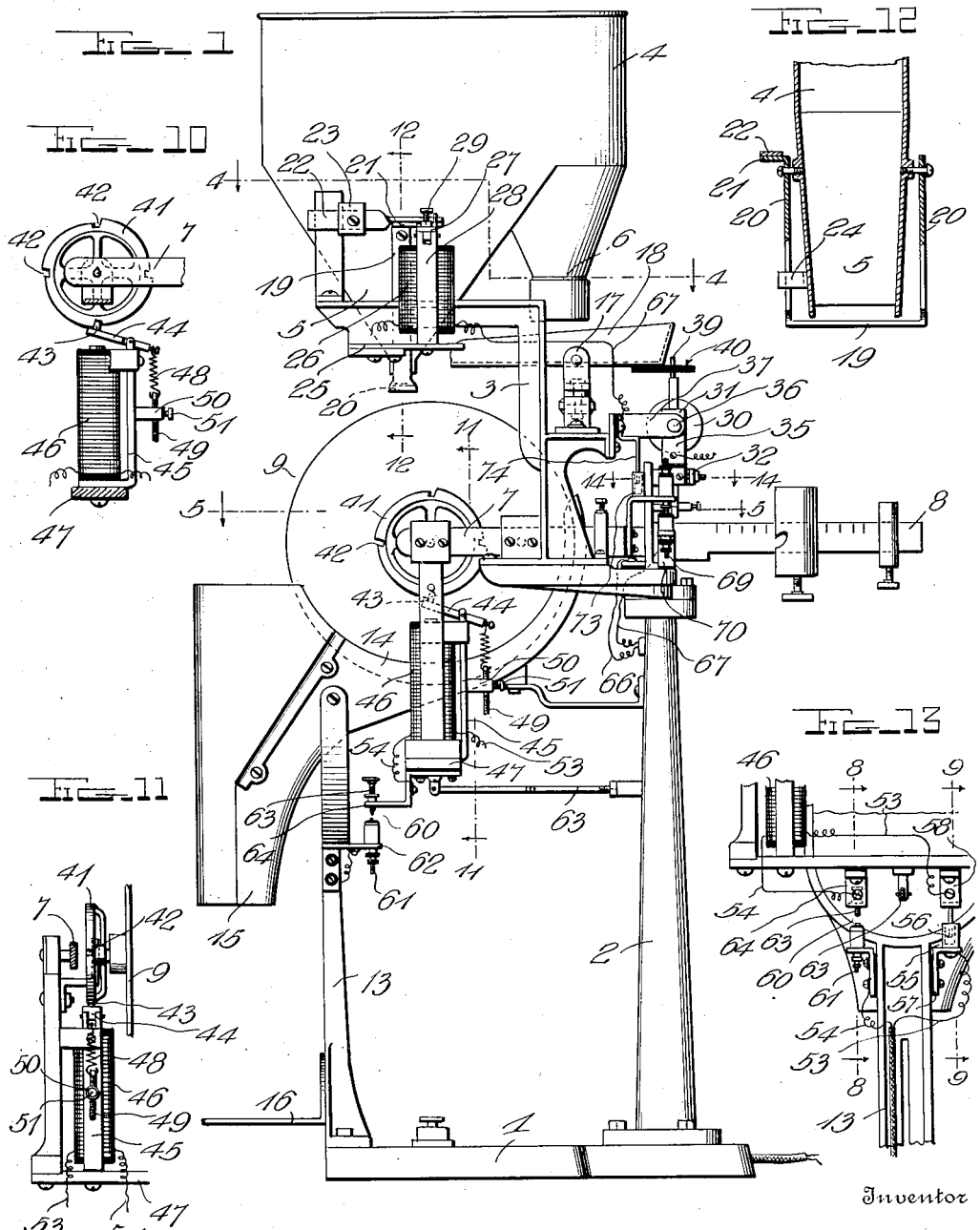
Witnesses
Inventor
Bernard P. Mulloy
Attorneys

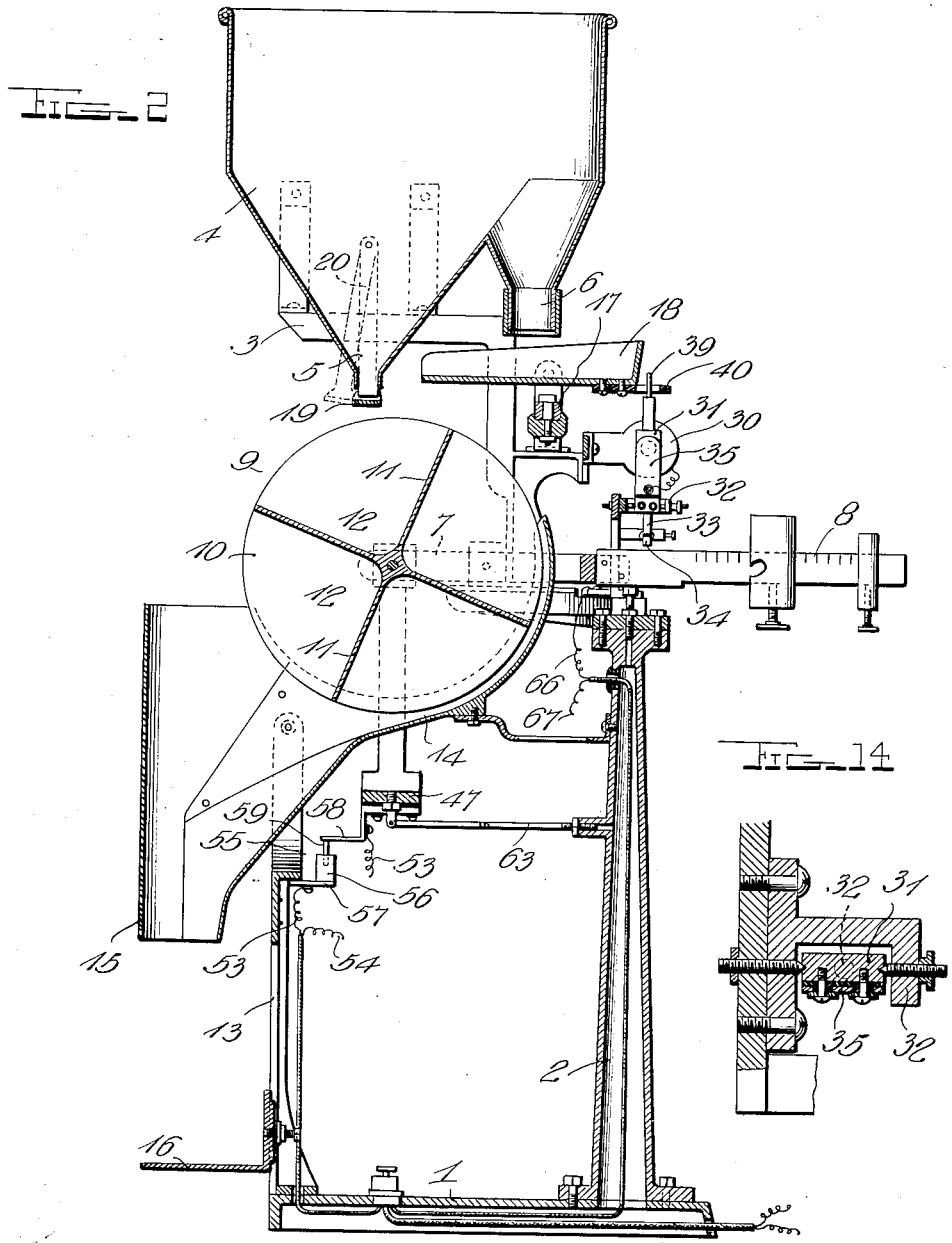

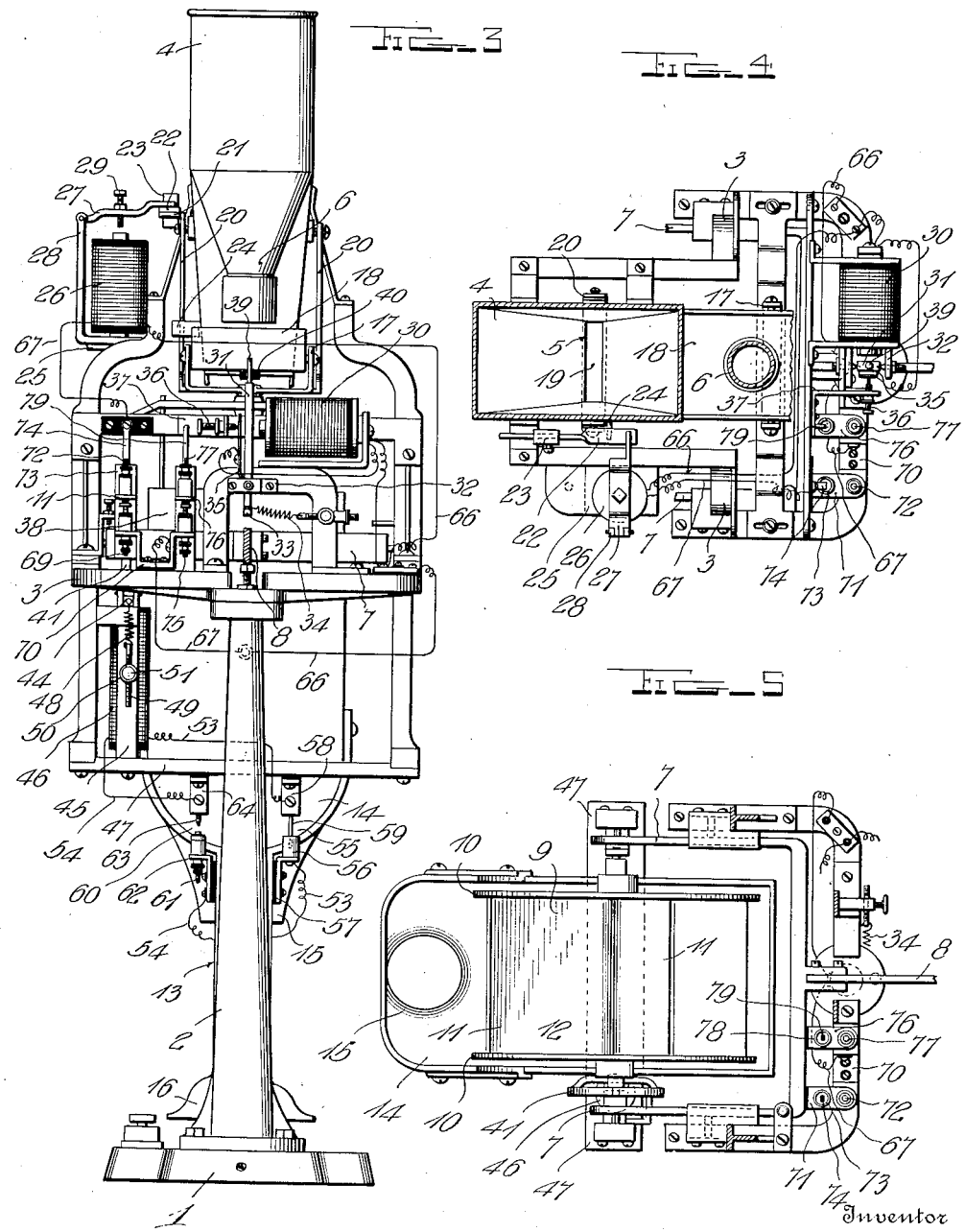

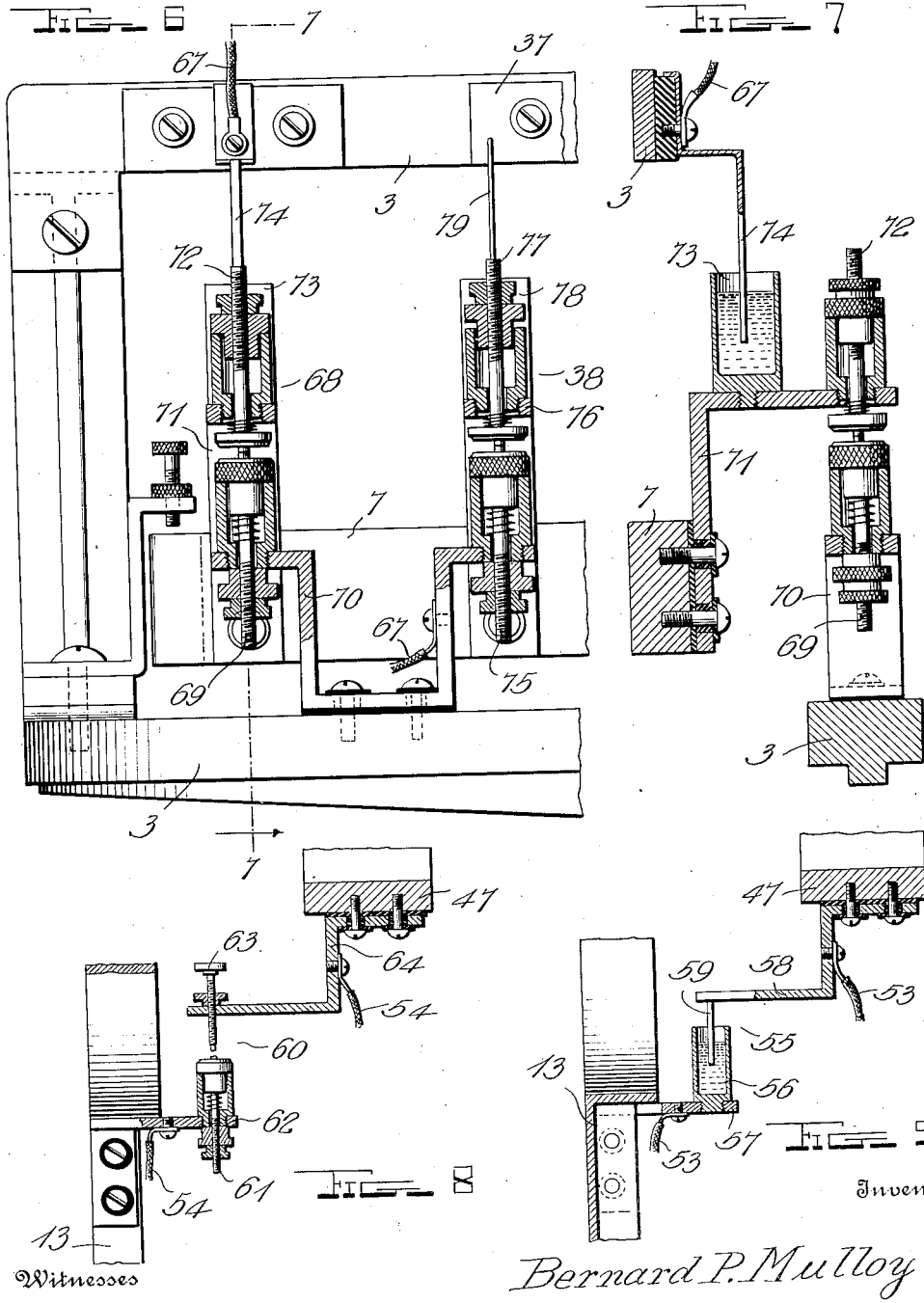

UNITED STATES PATENT OFFICE.

BERNARD PATRICK MULLOY, OF NEW ALBANY, INDIANA.

AUTOMATIC WEIGHING-MACHINE.

1,082,354. Specification of Letters Patent. Patented Dec. 23, 1913.

Application filed January 3, 1913. Serial No. 740,010.

*To all whom it may concern:*

Be it known that I, BERNARD PATRICK MULLOY, a citizen of the United States, residing at New Albany, in the county of Floyd and State of Indiana, have invented certain new and useful Improvements in Automatic Weighing-Machines; and I do declare the following to be a full, clear, and exact description of the invention, such as will enable others skilled in the art to which it appertains to make and use the same.

This invention relates to improvements in electric weighing machines.

One object of the invention is to provide a machine of this character in which a quantity of goods approximating the desired amount is first quickly weighed after which the parts are automatically operated to discharge more of the goods into the weighing receptacle until the exact weight is obtained whereupon the discharge of the goods into the receptacle is stopped thereby obtaining an accurate or absolutely correct weight without handling or measuring the goods, and which after being thus weighed are automatically discharged into the bag or other container provided to receive the same.

Another object of the invention is to improve the construction and operation of the measuring and weighing machine shown and described in United States Patent No. 924,570 issued June 8, 1909.

With these and other objects in view, the invention consists of certain novel features of construction, and the combination and arrangement of parts as will be more fully described and claimed.

In the accompanying drawings: Figure 1 is a side view of my improved weighing machine; Fig. 2 is a vertical sectional view thereof; Fig. 3 is a rear view; Fig. 4 is an irregular horizontal sectional view taken on the line 4—4 of Fig. 1; Fig. 5 is a horizontal sectional view taken on the line 5—5 of Fig. 1; Fig. 6 is an enlarged detail rear view of the portion of the rear supporting frame and of the scale beam and receptacle supporting frame showing in vertical section the circuit closers for the circuits of the magnets which control the discharging mechanism of the hopper; Fig. 7 is a detail vertical sectional view taken on the line 7—7 of Fig. 6; Fig. 8 is a detail vertical sectional view through the lower portion of the frame illustrating the construction and arrangement of the circuit closer for the magnet which controls the releasing mechanism of the receptacle and taken on the line 8—8 of Fig. 13; Fig. 9 is a similar view of the movable connection arranged in the circuit of the receptacle releasing magnet and taken on the line 9—9 of Fig. 13; Fig. 10 is a detail side view of the magnet which controls the releasing mechanism for the receptacle; Fig. 11 is a detail vertical sectional view taken on the line 11—11 of Fig. 1 and showing a rear view of the parts illustrated in Fig. 10; Fig. 12 is a detail vertical sectional view through the lower end of the main discharge spout of the hopper and through the gate which closes the latter taken on the line 12—12 of Fig. 1; Fig. 13 is a detail rear view of a portion of the frame and operating mechanism illustrating more particularly the arrangement of the circuit for the receptacle releasing magnet. Fig. 14 is a detail horizontal sectional view taken on the line 14—14 of Fig. 1.

Referring more particularly to the drawings, 1 denotes the hollow base of the machine on which near one end is arranged a main supporting standard 2. To the upper end of the standard 2 is secured a hopper and beam supporting frame 3 to the upper portion of which is secured a hopper 4 having a main discharge spout 5 and a supplemental discharge spout 6.

Pivotally mounted in the opposite sides of the frame 3 is a yoke 7 carrying the scale beam 8 which projects rearwardly above the standard 2 as shown. In the outer ends of the arms of the yoke 7 is revolubly mounted a receptacle 9 into which the goods to be weighed are discharged from the hopper and which is in the form of a cylindrical body having circular heads 10 between which are arranged a series of radially projecting partitions 11 which form a series of pockets 12.

Secured to the base 1 at the opposite end thereof from the standard 2 is a post or standard 13 having a forked upper end in which is secured a segmental chute 14 which terminates at its lower end in a spout 15 and which is adapted to receive goods when discharged from the receptacle 9 and to convey and deposit the weighed goods into a bag or other container arranged in position to receive the same. To the post or standard 13 is adjustably secured a bag supporting shelf 16 which is disposed below the discharge end of the chute 14 and on which is placed the bag or other container which is to receive the goods weighed by the machine.

Pivotally mounted on a transverse bar 17 secured to the hopper supporting frame 3 is a scoop or tray 18 which is disposed below the supplemental discharge spout 6 of the hopper and has its open end positioned near the discharge end of the main spout 5 of the hopper whereby the goods from the tray may be discharged into the same pocket or compartment of the receptacle as that into which the main spout of the hopper is discharging. The parts hereinbefore described as well as certain other parts which will be hereinafter referred to are substantially the same as the corresponding parts in the patent hereinbefore designated and do not form a part of the present invention which consists essentially in the means for automatically controlling the discharge of the goods from the hopper to the weighing receptacle and in the improved and simplified arrangement of the parts.

Arranged below and adapted to normally close the open lower end of the main discharge spout 5 is a gate or valve 19 which is preferably in the form of a flat plate the ends of which are formed integral with or otherwise secured to upwardly projecting supporting arms 20. The upper ends of the arms 20 are pivotally secured to the opposite sides of the spout 5 and thereby pivotally support the gate or valve. On the upper end of one of the arms 20 is an offset trip lug 21 to which is secured a forwardly projecting arm 22 having adjustably secured thereto a counter balancing weight 23 which when the gate opening mechanism is released and pressure removed from the lug 21, will automatically close the gate or valve 19 as will be hereinafter more fully described. Secured to one side of the spout 5 and projecting laterally therefrom in the path of movement of the adjacent gate supporting arm 20 is a stop lug 24 which limits the closing movement of the gate by the weight 23. Secured to a bracket 25 on the hopper supporting frame adjacent to the arm 20 having the trip lug 21 is an electro-magnet 26 the armature 27 of which is hinged at one end to a supporting bar 28 projecting upwardly from the bracket 25, and the opposite end of which is extended inwardly and projects above the trip lug 24. In the inner portion of the armature 27 is arranged a stop screw 29, the lower end of which is adapted to engage the upper end of the core of the magnet 26 when the latter is energized and the armature 27 attracted thereby. When the armature of the magnet is attracted the extended outer end of the armature will be engaged with the trip lug 21 and will swing the gate supporting arms 20 forwardly thereby opening the gate 19 from beneath the discharge end of the main hopper which will permit the goods to discharge from the latter into one of the pockets of the receptacle 8. By providing the stop screw 29 the movement of the armature 27 of the magnet will be regulated and the opening of the gate 19 by the extended end of the armature will be thus controlled so that goods of different kinds may be properly discharged from the hopper.

When a predetermined quantity of the goods has been discharged from the hopper into the receptacle the circuit of the electromagnet will be automatically broken by the movement of the receptacle supporting frame and the scale beam thereon, which parts together with the weight on the scale beam are overbalanced by the goods discharged into the receptacle as will be hereinafter more particularly described. When the circuit of the magnet has thus been broken and the magnet deënergized, the counterbalancing weight 23 on the arm 22 will immediately swing the valve or gate 19 to a closed position thus cutting off further discharge of the goods from the hopper through the main discharge spout thereof.

The goods discharged into the pocket of the receptacle through the main discharge spout of the hopper is only an approximate weight, or in other words, the weight is short a predetermined number of ounces of the full weight desired. The balance or rest of the goods required to make up the full amount of the weight desired is now gradually shaken into the pocket of the receptacle by the scoop or tray 18 which receives the goods from the supplemental discharge spout of the hopper as hereinbefore described and which is agitated or shaken by an electrically operated tray vibrating mechanism which is substantially the same as that shown in the patent hereinbefore referred to and which comprises an electromagnet 30 which is mounted in a suitable position on the hopper supporting frame of the machine. Co-acting with and vibrated by the magnet 30 is an armature 31 which is pivotally mounted in a supporting bracket 32 and has depending from its lower end an arm 33 to which is attached a coiled spring 34 which swings the armature in one direction while the magnet attracts and swings the same in the opposite direction. Secured to and insulated from the armature is a spring 35 which is engaged with an adjustable contact screw 36 arranged in the outer end of a supporting bracket 37 which has an electrical connection with a circuit closer 38 controlled by the movement of the scale beam 8 and receptacle 9 as will be hereinafter more fully described and by means of which the circuit of the electromagnet 30 is opened and closed at the proper time for deënergizing and energizing the magnet. On the upper end of the armature 31 is an upwardly projecting tray vibrating arm 39 the upper end of which is engaged with a slotted lug 40 formed of suitable insulating material and secured to the rear end of the tray or scoop as shown. By thus arranging the tray operating mechanism and properly connecting the circuit of the magnet 30 the armature thereof will be rapidly vibrated which movement will shake the tray or scoop 18 thereby causing the latter to discharge the goods therefrom into the pocket of the receptacle until the full amount or desired weight of the goods is obtained whereupon the receptacle 9 and its supporting frame and the scale beam will be tilted to their greatest extent. This further movement of the scale beam and its frame will operate the circuit closer 38 and break the circuit of the magnet 30 which will thus cease to vibrate its armature and the tray 18.

The receptacle 9 is held in position and against rotation while the goods are being weighed therein by a stop mechanism comprising a wheel 41 which is fixedly mounted on one of the journals of the receptacle and which has formed in its periphery series of stop notches 42 with which are engaged a stop lug 43 formed on one end of a stop lever 44 which is pivotally mounted on the upper end of a supporting bar 45 and forms the armature of an electro-magnet 46 which is secured to a supporting frame 47 carried by the receptacle and scale beam supporting frame 7 as shown. The lever 44 is normally held in position for engaging the lug 43 thereon with the notches 42 in the wheel 41 by a coiled spring 48 one end of which is secured to one end of the lever while the other end of the spring is secured to an adjusting screw 49 having a threaded engagement with a stud 50 on the supporting bar 45 and which is held in its adjusted positions by a set screw 51 as shown.

The electro-magnet 46 is connected by branch current conducting wires 53 and 54 to the main circuit wires in the base 1 of the machine. In the branch current conducting wire 53 of the magnet is arranged a loose contact or connection 55 comprising a cup 56 adapted to contain water or other conducting fluid and which is secured to a bracket 57 which in turn is fastened to and insulated from the post or standard 13. The other member of the loose connection 55 comprises a bracket 58 which is secured to the frame 47 carried by the receptacle and scale beam supporting yoke 7, said bracket 57 being suitably insulated from said frame 47. On the bracket 57 is a current conducting rod 59 which projects downwardly into the water or other fluid in the cup 56. By thus arranging the parts of the connection 55 it will be seen that this connection will not interfere with the movement of the scale beam and receptacle supporting frame and that the current will pass from the cup to the rod 59 through the water or other fluid in the cup. In the other current conducting wire 54 forming part of the circuit of the magnet 46 is a circuit closer 60 which comprises a fixed member in the form of a screw 61 which is adjustably secured in a supporting bracket 62 fastened to and insulated from the post 13, and a movable member in the form of a screw 63 which is adjustably secured in a bracket 64 fastened to and insulated from the frame 47 as shown.

The contact screws or members 61 and 63 of the circuit closer 60 are so adjusted that when the full weight of goods has been discharged into the receptacle and the receptacle supporting frame and scale beam overbalanced and tilted to their greatest extent the points of the contact screws 61 and 63 will be brought into engagement, thereby completing the circuit to the magnet 46 which when thus energized will attract the armature lever 44 thereby disengaging the lug 43 thereon from the notch 42 in the stop wheel 41 thus releasing said wheel and permitting the receptacle 9 to revolve under the weight of the goods which has been weighed in one of the pockets thereof and to bring this pocket into position for discharging the goods therefrom into the chute 14 and discharge spout 15 which conducts the goods to and discharges the same into the bag or other container on the shelf 16. As soon as the goods are discharged from the receptacle 9 the weight on the scale beam will tilt the latter and the yoke 7 and receptacle upwardly thereby disengaging the contact screws 61 and 63 and breaking the circuit of the magnet 46 which, when thus deenergized, will release the armature lever 44 and permit the spring thereof to swing the lever upwardly and to engage the stop lug thereon with the next stop notch in the wheel 41 thereby locking the receptacle in position to receive the next quantity of goods.

The frame 47 is loosely suspended from the receptacle and beam supporting yoke 7 and is held in position to properly support the current connecting member 58 and the circuit closing member 63 thereon by a brace rod 63 which is formed in loosely connected sections and is loosely secured at one end to the frame 47 and at its opposite end is adjustably secured to the standard 2 as shown.

The circuit of the electro-magnet 26 which operates the opening mechanism of the gate 19 of the main discharge spout 5 of the hopper 4 comprises branch wires 66 and 67, the wire 66 being connected directly to the main electric supply wires in the base of the machine while the wire 67 has arranged therein a circuit closer 68 which is operated by the movement of the receptacle and beam supporting yoke 7 whereby when the approximate weight of goods has been discharged in the receptacle 9 and the latter and its supporting yoke 7 and the scale beam are tilted to the slightest extent, the circuit of the magnet 26 will be broken thereby releasing the gate and permitting the weight thereof to close the same in the manner described.

The circuit closer 68 comprises a contact screw 69 which is adjustably mounted in a bracket 70 secured to and insulated from the frame 3 of the machine and to which is connected one end or terminal of the wire 67. The other or movable member of the circuit closer comprises a bracket 71 which is secured to and insulated from the scale beam and receptacle supporting yoke 7 and in the outer end of which is adjustably mounted a contact screw 72 which is normally in engagement with the contact screw 69 in the bracket 70. The bracket 71 has also secured thereto a cup 73 adapted to contain water or other conducting fluid and with which is loosely engaged a current conducting finger 74, secured to and insulated from a suitable part of the frame 3 as shown. To the finger 74 is connected the other end or terminal of the current conducting wire 67 forming one part of the circuit of the magnet 26 as hereinbefore described. By providing the loose connection formed by the cup 73 and finger 74 in the current conducting wire 67 it will be seen that the movement of the receptacle and beam supporting yoke 7 will not interfere with the circuit of the magnet 26 except when the circuit is broken by the opening of the circuit closer 68 which occurs by the over-balancing of the weighted scale beam when the goods are discharged into the receptacle 9 as hereinbefore described.

The circuit closer 38 for the magnet 30 which actuates the tray operating mechanism hereinbefore described is similar to the circuit closer 68 and comprises a contact screw 75 adjustably mounted in the bracket 70 which supports the stationary member of the circuit closer 68 and to which is electrically connected one terminal of the current conducting wire 67 which thus also forms one of the current conducting wires in the magnet 30. The movable member of the circuit closer 38 comprises a bracket 76 which is secured to and insulated from the scale beam and receptacle supporting yoke 7 and in the outer end of which is adjustably mounted a contact screw 77 which is adapted to engage the contact screw 75 in the bracket 70. The contact screw 77 is so adjusted with respect to the contact screw 72 of the circuit closer 68 that said contact screw 72 will be disengaged from its co-acting screw 69 before the contact screw 77 is disengaged from its co-acting screw 75. It will thus be seen that when the scale beam supporting yoke is tilted that the circuit of the magnet 26 which opens the gate will be broken and the gate will be permitted to close before the circuit of the magnet 30 which operates the tray is closed so that the tray continues to operate and discharge goods into the receptacle after the gate of the main discharge spout of the hopper has been closed. After the full weight of the goods has been discharged into the receptacle by the tray and the weight of these goods and the receptacle further over-balances the scale beam, the contact screw 77 will be disengaged from the screw 75 thereby at this time breaking the circuit of the magnet 30 and stopping the operation of the tray. On the bracket 76 of the circuit closer 38 is arranged a cup 78 adapted to contain a suitable conducting fluid and with which is engaged a current conducting finger 79 which is secured to the bracket 37 which carries the terminal or contact screw 36 with which the spring 35 of the armature 31 is engaged as hereinbefore described.

As soon as the circuit of the tray operating mechanism is broken and the movement of the tray thus stopped the circuit of the magnet 46 will be closed, thus energizing the magnet and causing the same to attract its armature thereby disengaging the lug 43 from its notch 42 in the stop wheel of the receptacle 9 and permit the latter to turn and discharge the goods therefrom in the manner described.

By constructing and arranging the parts as herein shown and described it will be seen that the first estimate of the amount of goods is quickly and accurately obtained by weight, so that the same receptacle may be employed for all kinds of goods weighed, or in other words, the correct amount of light or bulky goods as well as heavy goods may be ascertained in the same receptacle, this being impossible when the goods are measured in bulk for instance, a receptacle of the correct size for measuring the bulk of one pound of rice would not begin to hold one pound of coffee, therefore the advantage of obtaining the preliminary amount of goods by weight instead of by bulk will be apparent.

What is claimed is:

1. In a weighing machine, a hopper having main and supplemental discharge spouts, a gate for the main discharge spout, electrically operated means for controlling said gate, a weighing mechanism including a receptacle adapted to receive the goods from said spouts, a tray beneath said supplemental discharge spout, electrically controlled means for dumping said tray into the receptacle after said gate is closed, electric circuits connected with both said means, circuit closers in said circuits, and means for actuating the circuit closers by said weighing mechanism.

2. In a weighing machine, a hopper having main and supplemental discharge spouts, a gate for said main spout, a weight normally holding said gate closed, electrically operated means for opening said gate to a greater or less extent, a weighing mechanism including a receptacle adapted to receive the goods from the hopper, a tray beneath said supplemental spout, electrically controlled means for dumping said tray into the receptacle after the gate is closed, electric circuits connected with both said means, devices actuated by said weighing mechanism whereby the circuit of the gate operating means is broken after the circuit of the tray operating means is broken, electrically controlled means to hold said receptacle against movement while being filled, and a circuit closer for said last-named means adapted to be closed by said weighing mechanism.

3. In a weighing machine, a hopper having main and supplemental discharge spouts, a weighing mechanism and its receptacle, means controlled by said weighing mechanism to check the discharge of said goods from the main spout, a tray under the supplemental spout, and means controlled by said weighing mechanism to check the delivery from said tray to the receptacle when the full weight of the goods has been supplied to the latter.

4. In a weighing machine, a hopper having main and supplemental discharge spouts, a gate to open and close the main discharge spout of the hopper, electrically operated means for opening and permitting said gate to close, a weighing mechanism including a weighing receptacle adapted to receive the goods from the hopper, a goods receiving and feeding tray arranged beneath said supplemental discharge spout of the hopper, electrically controlled means for operating said tray whereby goods are discharged into the receptacle after the gate of the main discharge spout is closed, electric circuits connected with said gate and tray operating means, circuit closers arranged in said circuits and actuated by said weighing mechanism whereby the circuit of the gate operating mechanism is broken and the gate permitted to close and whereby after the full amount of goods has been supplied by said tray, the circuit of the tray operating mechanism will be broken and the operation of the tray stopped.

5. In a weighing mechanism, a hopper having main and supplemental discharge spouts, a gate to open and close said main discharge spout of the hopper, a weight to close and normally hold said gate in closed position, electrically operated means for opening said gate to a greater or less extent and for permitting the same to close under the action of said weight, a weighing mechanism including a weighing receptacle adapted to receive the goods from the hopper, a goods receiving and feeding tray arranged beneath the supplemental spout of the hopper, electrically controlled means for operating said tray whereby goods are discharged into the receptacle after the gate of the main discharge spout is closed, electric circuits connected with said gate and tray operating means, circuit closers arranged in said circuits and actuated by said weighing mechanism whereby the circuit of the gate operating mechanism is broken and the gate permitted to close after the circuit of the tray operating mechanism is broken and the operation of the tray thus stopped, means to hold said receptacle against movement while being filled, electrically controlled means to release said receptacle holding mechanism, an electric circuit connected with said electric release controlling means, and a circuit closer in said circuit adapted to be closed by said weighing mechanism and the receptacle thereby released when the full weight of goods has been deposited into the receptacle and after the circuit of the tray operating mechanism has been broken.

In testimony whereof I have hereunto set my hand in presence of two subscribing witnesses.

BERNARD PATRICK MULLOY.

Witnesses:
    WALTER V. BULLEIT,
    EDWARD DOHERTY.